United States Patent [19]

Tokitsu et al.

[11] Patent Number: 4,500,868
[45] Date of Patent: Feb. 19, 1985

[54] AUTOMOTIVE DRIVING INSTRUCTION SYSTEM

[75] Inventors: Naoki Tokitsu, Chiryu; Toshitaka Fujiwara, Toyota; Toranosuke Kato, Nagoya; Toshihiko Uno, Toyota, all of Japan

[73] Assignees: Nippondenso Co., Ltd., Kariya; Toyota Jidosha Kogyo Kabushiki Kaisha, Toyota, both of Japan

[21] Appl. No.: 324,488

[22] Filed: Nov. 24, 1981

[30] Foreign Application Priority Data

Nov. 26, 1980 [JP] Japan .............................. 55-166150

[51] Int. Cl.³ ............................................. B60Q 1/00
[52] U.S. Cl. ............................... 340/52 F; 340/52 R; 180/282; 434/65; 364/424
[58] Field of Search ...................... 340/52 F, 52 R, 53, 340/573, 27 R, 27 SS, 27 AT, 963–966, 971, 973, 978; 200/42 R; 434/62, 64, 65, 66, 68, 71; 364/424; 180/271, 272, 282

[56] References Cited

U.S. PATENT DOCUMENTS

| | | | |
|---|---|---|---|
| 4,058,796 | 11/1977 | Oishi et al. | 340/52 F |
| 4,150,497 | 4/1979 | Weber | 340/52 F |
| 4,258,421 | 3/1981 | Juhasz et al. | 340/52 F |
| 4,271,402 | 6/1981 | Kastura et al. | 340/52 F |

FOREIGN PATENT DOCUMENTS

56-76029  6/1981  Japan ................................. 364/424

Primary Examiner—Donnie L. Crosland
Attorney, Agent, or Firm—Cushman, Darby & Cushman

[57] ABSTRACT

An automotive driving instruction system which comprises a plurality of sensors including a vehicle speed sensor etc. mounted at various parts of the automobile, a computer for reading the outputs of the sensors for calculating the driving conditions of the automobile, and a replaceable external memory unit. The computer calculates a plurality of values representing the driving conditions of the automobile on the basis of the outputs of the sensors, and controls to generate an alarm when any of the values thus calculated becomes to corresponding one of a plurality of predetermined values. Also, the accumulated value of the alarms and the respective accumulated values of the alarms for each of causes of alarming are stored in the external memory unit. At the end of a driving, the external memory unit is demounted, so that any habits of the driver is determined from the data stored in the external memory unit to contribute to the correction thereof.

10 Claims, 8 Drawing Figures

AUTOMOTIVE DRIVING INSTRUCTION SYSTEM

BACKGROUND OF THE INVENTION

The present invention relates to a driving instruction system intended to contribute to the driving safety and the saving of energy by monitoring the driving conditions all the time and issuing an alarm against an unsafe behaviour or an uneconomical driving operation of the driver.

Conventionally it is known a system in which the automobile speed, engine rotational speed or abrupt braking is detected and an alarm is issued against any abnormal value of such an operation.

Generally, on the other hand, an operating recorder is mounted in an automobile and the figures recorded in this device are analyzed thereby to determine the driving conditions.

The true driving conditions cannot be determined by a single phenomenon such as the vehicle speed or engine rotational speed, and it has so far been difficult to issue a proper alarm satisfactory to the driver.

Further, in conventional systems, an alarm is simply issued upon detection of an improper driving condition, and what has been improper is not analyzed nor used as data for educational control of the driver.

Also, in spite of the fact that the changes in vehicle speed, engine rotational speed or operating conditions are recorded in the operating recorder and the record is analyzed, the resolution of the recording paper of the operating recorder is limited so that a bulky and expensive machine is required to process the obtained data mechanically. In addition, an accurate analysis has not yet been realized.

The above analysis of the data is made almost manually and it requires great time and expenses.

In view of the disadvantages of the conventional systems, it is an object of the present invention to provide an automotive driving instruction system which monitors the driving conditions more generally than in conventional systems and also contributes to safer and more economical driving. The automobile driving system according to this invention comprises a plurality of sensors mounted at various parts of the automobile in order to determine the driving conditions, calculates the driving conditions all the time on the basis of the states of the respective sensors, determines whether the result of calculation meets a predetermined conditions, and issues a warning on the basis of the result of determination. The system according to this invention comprises also a replaceable external memory unit for storing the accumulated value of not only all the alarms but also the accumulated values of the respective alarms for each of causes of alarming, the external memory unit being adapted to be demounted at the end of a driving so that the data therein is processed on a processor. The data thus processed are indicated thereby to clarify and correct any habit of the driver involved.

According to a preferred embodiment of the present invention described below, an alarm is issued while at the same time indicating the total number of such an alarm, thus enhancing the consciousness of the driver.

Further, working switches for "driving", "loading", "rest" and the like are provided, and each time these switches are operated, the state of the switches and the time involved are stored in the external memory unit. The data thus stored are processed in a processor. In this way, it is possible to prepare data on the driving control useful for instructing the driver on safe driving.

According to the present invention, the changes in vehicle speed or engine rotational speed are recorded merely in time series but are processed at real time, so that an alarm is issued and indicated from time to time against an unsafe behaviour or an uneconomical driving. In this way, a standard is set for the driving which has so far been often governed by dogmatism, thus enlightening the driver.

Furthermore, the driver's work is properly distributed by recording the working conditions of the driver so as not to impose harsh work on the driver.

As a result, the system according to the present invention is expected to make great contributions to the safety, economy and labor control of the driver and driving.

DESCRIPTION OF THE PREFERRED EMBODIMENTS

An embodiment of the present invention will be described below with reference to the accompanying drawings.

Figure 1:
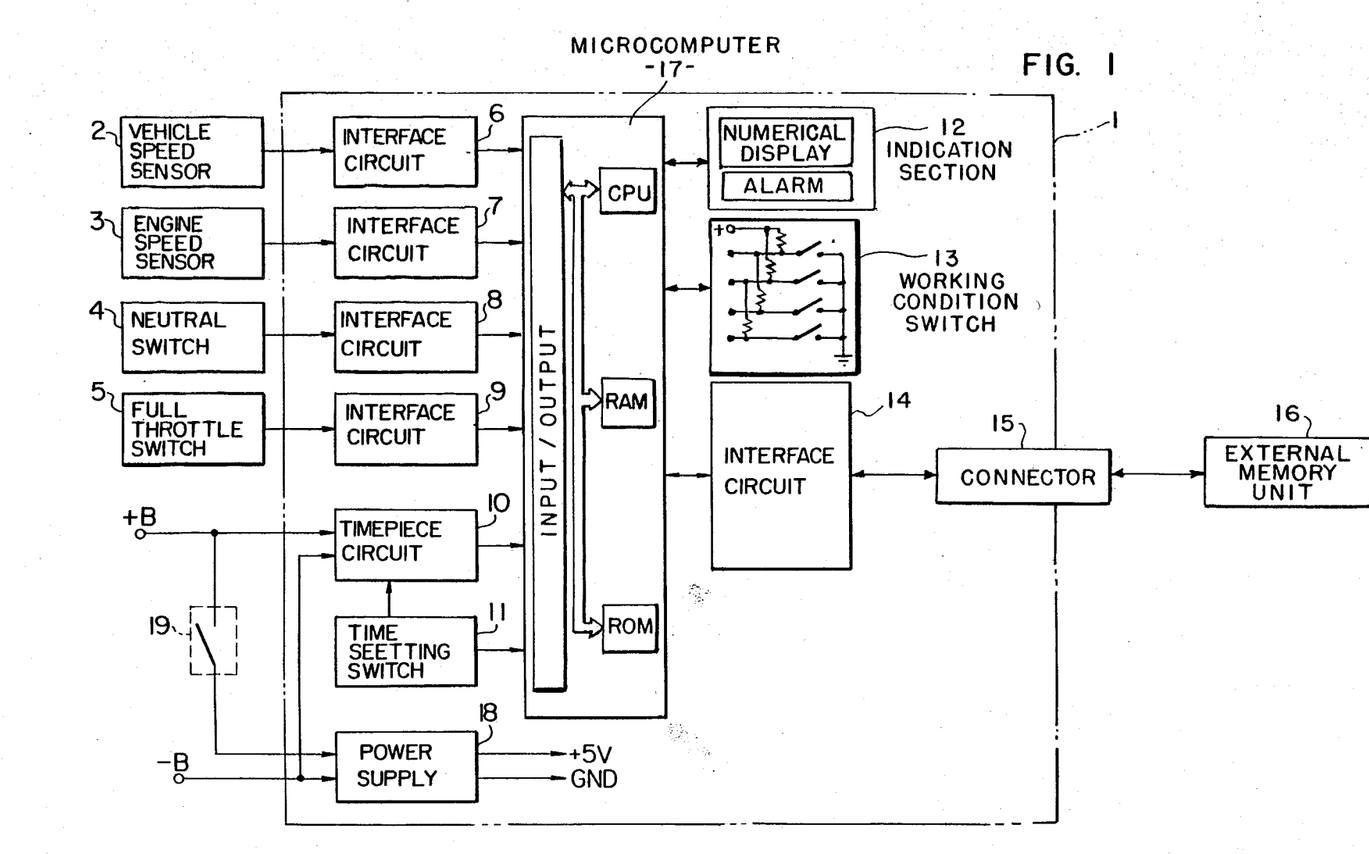
FIG. 1 is a block diagram showing the construction of a system according to the present invention.

A block diagram of the construction of the apparatus according to the present invention is shown in FIG. 1. Reference numeral 1 designates a system according to this invention, and numeral 2 a vehicle speed sensor for detecting the speed of the automobile using a generally-known reed switch for generating four pulses for each revolution of the axle. Numeral 3 designates an engine rotational speed sensor for detecting the number of revolutions of the engine which sensor uses a generally-known electromagnetic pick-up for the diesel engine for generating a pulse for every two revolutions of the crank shaft of the engine.

Numeral 4 designates a neutral switch adapted to be closed when the transmission is neutral. Numeral 5 designates a full throttle switch adapted to be closed when the accelerator pedal is depressed substantially to the full.

Numeral 6 designates an interface circuit for the vehicle speed sensor for shaping and applying the waveform from the sensor to the input port of the microcomputer 17. Numeral 7 designates an interface circuit for the engine rotational speed sensor, which also shapes the waveform of the signal from the sensor to apply the shaped signal to the microcomputer. Numerals 8 and 9 denote interface circuits for the switches for removing the chattering of the switches and applying the resulting signal to the microcomputer. For the interface circuits 6-9, use may be made of the wave form shaping circuit disclosed in Denso Technical Report No. 225, page 27, published in February 1977, or Denso Technical Report No. 240, page 80, published in May 1978.

Numeral 10 designates a timepiece circuit using an LSI for the watches or clocks which LSI are commercially available, which directly applies a time output to the input port of the microcomputer. Numeral 11 designates a time setting switch which may be operated to set the time.

The time piece circuit 10 is directly supplied with the power from +B and −B terminals of the battery of the automobile, and the time indicated thereon remains unchanged even by the cut-off of the key switch after being set.

Numeral 12 designates an indication section using four light-emitting diodes of seven segments for numeral indication of four digits in accordance with the output of the microcomputer. The indication section or indication device comprises a numerical display and alarm. The numerical display may be of the fluorescent display tube etc. type disclosed by Ryoichi Mori, "Microcomputer Series 8, One Chip Microcomputer", pp. 164–165, and pp. 136–137, published in 1979. As the alarm, a buzzer may be used.

Numeral 13 designates a working condition switch system comprised of four switches named "driving", "loading", "waiting" and "rest" in accordance with the working condition of the driver. The four switches are operatively interlocked with each other so that any one of the switches may be selectively closed by the operation of the driver. The working condition switch 13 is constructed such that when the driver operates to close any one of the four switches, all of other three switches open. This construction is such that the four switches are interlocked as stated above. This construction itself is known in switches of tape recorders, etc. For example, in a tape recorder, when the reverse switch is operated while the forward switch is in its closed state, the forward switch is released automatically.

Numeral 14 designates an interface circuit for the external memory unit, which interface circuit is connected with the address line, the data line and the control line of the microcomputer for switching the bidirectional bus lines. This interface circuit is of the same type as the one used for the computers in general.

Numeral 15 designates a connector for connection with the external memory unit 16. The external memory unit 16 takes the form of memory card including a semiconductor RAM board, a simple power supply like a mercury cell and a connector. Numeral 18 designates a power circuit for generating a voltage of 5 V used for the internal parts of the present system from the voltages at the +B and −B terminals of the automotive battery and supplying the same to each block. The connections from the power circuit 18 to the blocks are not shown in the drawings.

Numeral 19 designates a main switch for supplying or switching off power from the power supply to the system in general. This main switch is interlocked with the ignition switch and is adapted to open or cut off the power only when the ignition switch is off.

Figure 2:
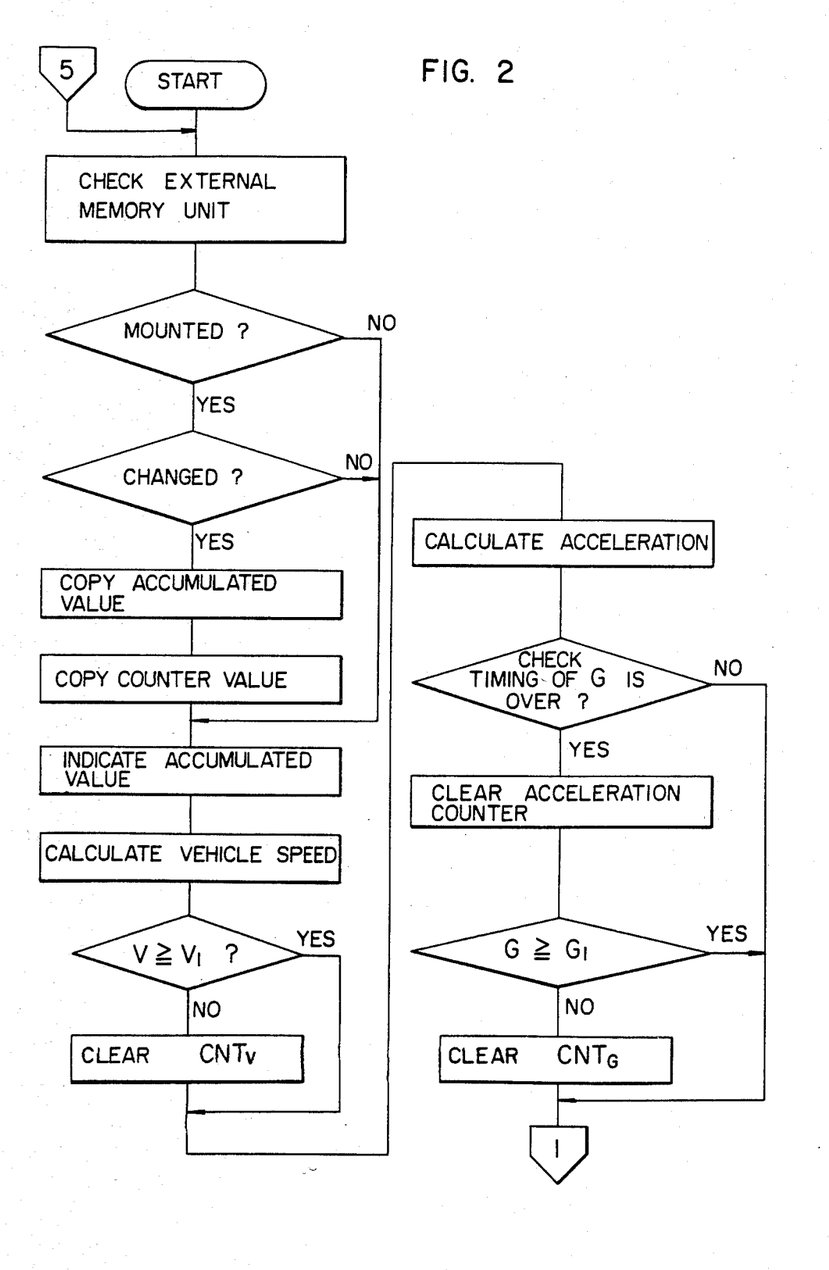
FIGS. 2 to 5 are flowcharts showing a series of programs for explaining the operation of the system according to the present invention.
Figure 3:
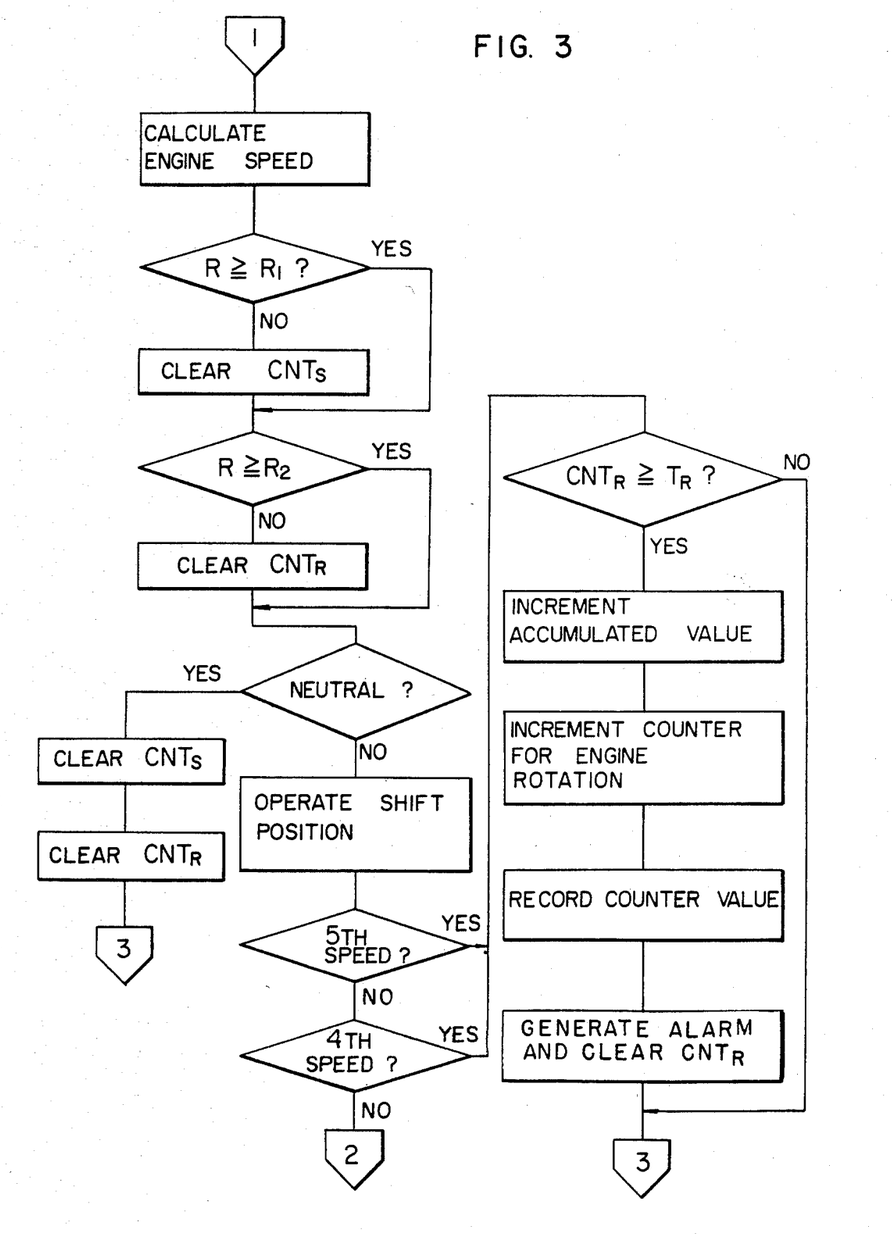
Figure 4:
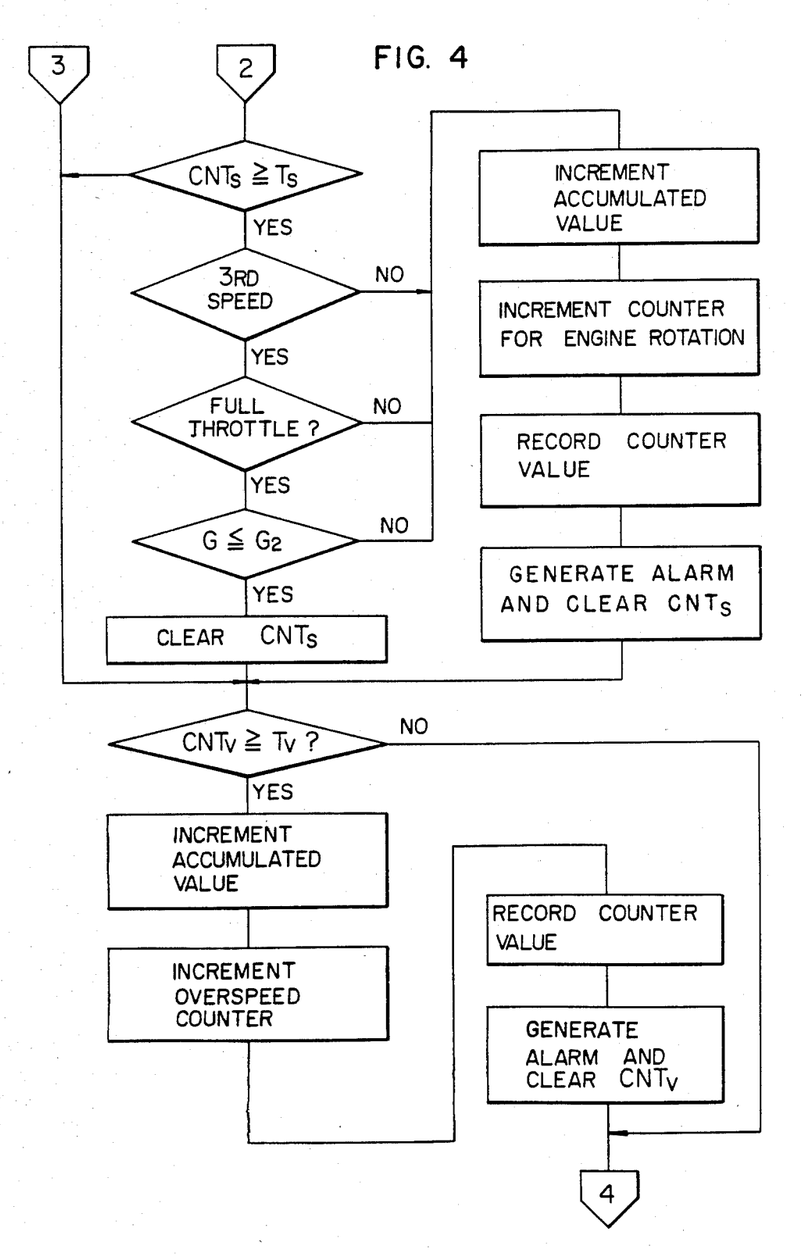
Figure 5:
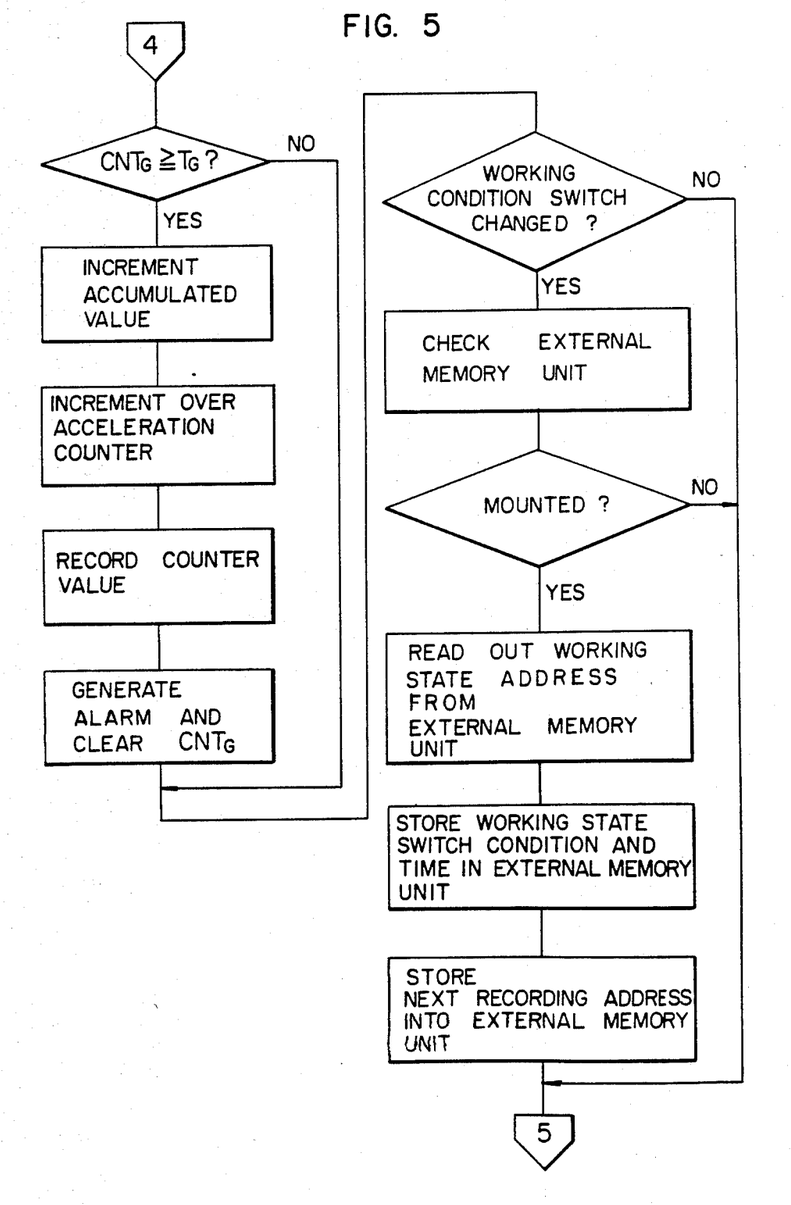
Figure 6:
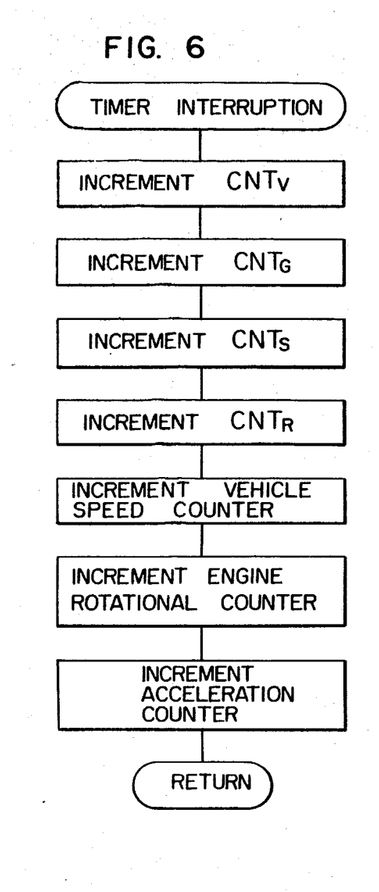
FIGS. 6 to 8 are flowcharts showing an interruption program for explaining the operation of the system according to the present invention.
Figure 7:
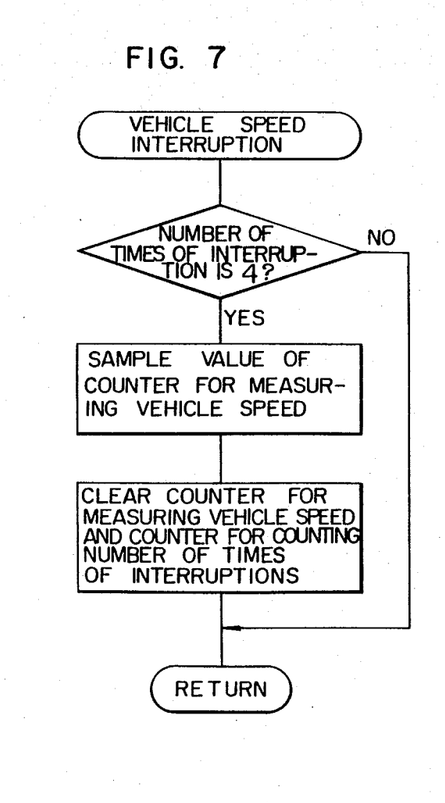
Figure 8:
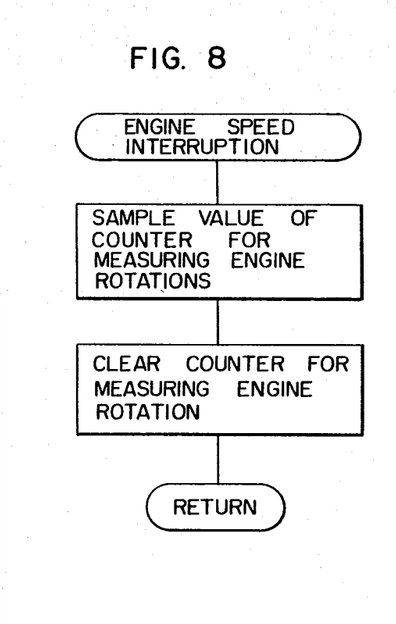

A flowchart for explaining the general operation of the system is shown in FIG. 2. The operation of the embodiment of the present invention will be explained in detail below.

In this system, the vehicle speed and the engine rotational speed are fetched by interruption process. First, the fetching of the vehicle speed will be explained. The pulse generated in the vehicle sensor 2 is waveform-shaped at the interface circuit 6, and applied to the interruption terminal of the microcomputer 17. The microcomputer 17 enters the vehicle speed interruption routine each time the rising edge arrives of the pulse is applied to this terminal. During the vehicle speed interruption, the number of the interruptions is counted, and when the count reaches four, the data in the vehicle speed counter are stored in a memory (RAM) of the microcomputer 17. The vehicle speed counter is incremented in the timer interruption routine without being reset, and this results that the time corresponding to the four vehicle speed pulses is measured and stored. Thus, while the pulses from the vehicle speed sensor are applied, the period for the four pulses is always measured and stored. The conversion from the time into vehicle speed is effected by the main routine.

The engine rotational speed is also measured by the same method as the vehicle speed. In the case of the engine rotational speed, however, the figure on the counter is stored each time the interruption occurs, and the measuring counter is subsequentially cleared so that the time required for two revolutions of the engine is always measured. The conversion from the particular time to rotational speed is effected by the main routine.

The timer interruption will be now explained. This computer contains a timer for setting the timer value by program. According to the embodiment under consideration, the timer value is set to 1 msec so that the timer interruption routine is entered once every 1 msec.

In the timer interruption routine, the vehicle speed and engine rotational speed counters are incremented on the one hand and the counters called $CNT_V$, $CNT_G$, $CNT_S$ and $CNT_R$ are incremented at the same time. Each of these counters actually takes the form of RAM in the microcomputer and is labelled as described above.

The counter $CNT_V$ is for counting the time in which the vehicle speed exceeds a predetermined value of speed, the counter $CNT_G$ for counting the time in which the acceleration exceeds a predetermined value, the counter $CNT_S$ for counting the time in which the number of revolutions of the engine exceeds a predetermined value for the first, second or third speed position of the transmission, and the counter $CNT_R$ for measuring the time in which the number of revolutions of the engine exceeds a predetermined value for the fourth or fifth speed of the transmission.

The operation of the system will be explained with reference to the main flowchart. The operation of the system according to the invention is started by switching on a power to the system.

After switching on of the power, the driver is required to check to see whether the external memory unit is mounted first of all. In such a checking, according to this system, predetermined data are written at a predetermined place of the external memory unit followed immediately by reading them out and comparing them with the written data. By doing so, both the mounting and the replacement of the external memory unit are checked at the same time.

When the external memory unit is mounted, data are read further from a predetermined address where the code of the driver is stored. By confirming the driver code, it is checked whether the driver is changed or not. If the driver is changed, the accumulated values and the counter values stored in the computer thus far which belong to the preceding driver are replaced with the accumulated values and counter values read from the recording address of a new memory unit and restored into the computer, thus making preparations for monitoring and recording the behaviour of the new driver.

The accumulated values stored in the computer are subsequently produced and indicated on the indication section, so that the conditions of the new driver are indicated.

Then the routine of vehicle speed calculation is entered. As described above, in the vehicle speed interruption routine, the period of four vehicle speed pulses is always measured. Let such a period be Tv. Then the period Tv may be converted into the vehicle speed easily by calculating $$V = K_v/T_v$$

where Kv is a constant.

The value V obtained by this calculation is stored not only in memory unit of the computer but also in another memory unit with the preceding value V as $V_{OLD}$. This is for calculating the acceleration.

After conversion into the vehicle speed, the resulting value is verified. Assuming that the value $V_1$ is a constant set by the program an operation to carry out a comparison of $V \geq V_1$ is made. That is, it is determined whether V is equal to or larger than $V_1$. In other words, it is verified whether or not the present vehicle speed is higher than a predetermined value. According to the embodiment under consideration, for instance, V is set to be 80 km/h. If the vehicle speed is less than 80 km/h, the counter $CNT_V$ is always cleared, while if the vehicle speed is higher than 80 km/h, the counter $CNT_V$ continues to be incremented in the timer interruption routine. It is determined whether or not the data in counter $CNT_V$ has exceeded the predetermined time in the later part of the main routine. If the data in the counter $CNT_V$ has exceeded the predetermined time, the accumulated value is incremented while at the same time incrementing the counter value for overspeed, and after storing the accumulated value and the counter value in the external memory unit, the counter $CNT_V$ is cleared.

By the above-mentioned operation, the time for which the speed of 80 km/h is exceeded is determined, and when the speed exceeds 80 km/h for longer than a predetermined length of time, an alarm is issued while at the same time indicating and storing in the external memory unit the result of the detection and alarming.

The acceleration is also checked in the same manner. For checking the acceleration, however, another memory unit is used to store the latest vehicle speed V as $V_{OLD}$ at regular intervals of time. For measuring a predetermined length of time, on the other hand, an acceleration counter is used. When the timing of checking the acceleration arrives, this acceleration counter is cleared for checking the acceleration. The acceleration is checked in such a manner that the value $V_{OLD}$ which was stored a predetermined time before is subtracted from the latest vehicle speed V obtained by the speed calculation as shown below.

$$V - V_{OLD}$$

By effecting this calculation, a speed variation for a predetermined length of time is recognized.

The value of acceleration G thus calculated is checked, and if it is smaller than the acceleration $G_1$ set in the program, the counter $CNT_G$ is cleared, while if the acceleration G is larger than the value $G_1$, the counter $CNT_G$ is left uncleared, with the result that the time for which the predetermined level of acceleration is exceeded is determined as the count on the counter $CNT_G$.

As in the case of vehicle speed, the value on the counter $CNT_G$ is checked in the main routine, and when the excess continues for longer than a predetermined length of time, the accumulated value is incremented while at the same time incrementing the count on the acceleration counter. The resulting value is stored in the external memory unit and an alarm is issued on the one hand and the counter $CNT_G$ is cleared on the other hand. According to the embodiment under consideration, the time of 2 seconds is set for the counter $CNT_G$, and 0.07 G is set as the value of $G_1$, so that when the acceleration of more than 0.07 G continues for longer than 2 seconds, an alarm is issued and the fact is stored in the external memory unit.

In monitoring the engine rotational speed which depends on the transmission position, two setting are provided for the first, second and third speeds, and the fourth and fifth speeds.

Specifically, since the low gear position is used for vehicle start and requires a high rotational speed unavoidably, a single setting fails to meet the actual operating conditions. Also, the program is made such that it is not regarded as a bad driving only when the vehicle runs at the third speed with full throttle at low acceleration in view of the case in which the vehicle runs on a long ascendant slope with full load.

In other words, in the step 1 and subsequent steps in the flowchart, the engine rotational speed is calculated first of all. This calculation is made in the same manner as the vehicle speed by the following equation:

$$R = K_R/T_R$$

where $T_R$ is the value on the engine speed counter sampled during the engine speed interruption, and $K_R$ is a constant.

The value R obtained by this calculation is stored in the memory. After converting the result of calculation into the rotational speed, it is checked whether R is equal to or larger than $R_1$ ($R_1 = 3000$ rpm). If the value R is lower than 3000 rpm, the counter $CNT_S$ is cleared. Then it is checked whether R is equal to or larger than $R_2$ ($R_2 = 2500$ rpm), and when the value R is smaller than 2500 rpm, the counter $CNT_R$ is cleared.

In this way, when the engine speed is 3000 rpm or higher, the counters $CNT_S$ and $CNT_R$ continue to be incremented by the timer interruption, and when the engine speed is 2500 rpm or more and less than 3000 rpm, the counter $CNT_R$ alone continues to be incremented by the timer interruption, thus determining the time in which the two set values are exceeded.

After these operations, the neutral switch is checked and if it is positioned at neutral, the counters $CNT_S$ and $CNT_R$ are cleared followed by a jump to the symbol 3 in the flowchart. This is because in the case of neutral position, the shift position is inaccurate and the rotational speed is not checked accurately.

In the case where the neutral switch is not at neutral position, on the other hand, it is checked which of the above-mentioned two settings should be compared. In the case of transmission position of the fourth or fifth speed, it is checked whether the value on counter $CNT_R$ is equal to or larger than $T_R$ ($CNT_R \geq T_R$). If the value on the counter $CNT_R$ is equal to or more than $T_R$, namely, if the time for which the engine rotational speed exceeds 2500 rpm at the fourth or fifth speed continues for $T_R$ or more, the driving involved is considered to be bad, and the accumulated value is incremented on the one hand and the counter for the engine rotational speed is incremented on the other hand. Further, the result is stored in the external memory unit while at the same time issuing an alarm and clearing the counter $CNT_R$.

When the value of the counter $CNT_R$ is less than $T_R$, no action is taken but the process is jumped to symbol 3 in the flowchart to continue the incrementation of the counter $CNT_R$.

At the transmission position of the first, second or third speed, it is checked whether the value on counter $CNT_S$ is equal to or more than $T_S$. When the value on the counter $CNT_S$ is equal to or more than $T_S$, namely, when the time for which the engine rotational speed exceeds 3000 rpm at the first, second or third speed continues for $T_S$ or more, the driving involved is considered inferior, with the result that the accumulated value is incremented on the one hand and the value on the engine rotational speed counter is stored in the external memory unit on the other hand. Further, an alarm is issued and the counter $CNT_S$ is cleared. In the case of checking the counter $CNT_S$, however, as mentioned above, such an exception is made that when the acceleration is $G_2$ (0.02 G) or lower at the third speed with the throttle fully open, the driving involved is not considered inferior and the counter $CNT_S$ is cleared.

By the operations described above, it is monitored always whether the vehicle speed, acceleration and engine rotational speed are within a range of appropriate values, and if any of the vehicle speed etc. exceeds the appropriate value, an alarm is issued to warn the driver while at the same time indicating the accumulated value. Also, the counts on the respective counters are stored in the external memory unit, so that such data may be processed in a processor not shown.

After these operations, the states of the working condition switch are checked. If it is determined that the state of the working condition switch has changed, it is checked to see whether the external memory unit is mounted or not. If the external memory unit is mounted, the address data to store the working condition is read from the external memory unit, and the present switch condition and the present time data are stored in that address. After this operation, the address for the next storage is calculated, and the result of the calculation is stored in a predetermined place in the external memory unit.

The general operation of the system according to the present invention is now completed, and the process is returned to the top of the flowchart, and the above-mentioned monitoring operation is continued until power is cut off.

The external memory unit employed in this embodiment comprises a CMOS memory circuit, a back-up battery for holding the data in the memory circuit, a case containing the memory circuit, and a connector attached thereto. The external memory unit is constructed such that reading or writing of the memory may be made freely by connecting the memory through the connector to the bus lines of the microcomputer.

The construction of the system according to the present embodiment is summarized in A to F below.

A. A driving instruction system which calculates the driving conditions of the automobile on the basis of the states of the sensors provided at various parts of the automobile, and issues an alarm when the result of calculation becomes equal to any of a plurality of predetermined conditions.

B. System of A which accumulates the number of alarms each time of issuance of an alarm and indicates the number.

C. A system of A which comprises therein a plurality of counters corresponding to the plurality of conditions, and increments and stores the data in the counter involved each time of issuance of an alarm.

D. A system of A which comprises a replaceable external memory unit for storing the accumulated value of B and the data in the counters of C each time of issuance of an alarm.

E. A system according to D which comprises a plurality of switches corresponding to the working conditions of the driver, and a clock, and stores the condition of the switch operated and the time of switch operation in time sequence in the external memory unit in response to the operation of the switch.

F. A system according to D, which stores the code of the driver at a predetermined address of the external memory unit beforehand and detects the replacement of the external memory by reading the code at every predetermined period, reads accumulated values of issuance of alarm and the values of the counters recorded in the external memory unit and rewrites the read out data, and carries out indication of the accumulated value and storing of the same in the external memory unit on the basis of the values obtained after the rewriting from the next issuance of the alarm.

In the above-described embodiment, instead of monitoring the engine rotational speed associated with the vehicle speed, acceleration and transmission position and issuing an alarm and storing the result of monitoring in the external memory unit, the total number of engine rotations may be counted and indicated or stored in the external memory unit with equal effect.

Also, the distance coverage may be calculated or recorded from the vehicle speed, or a plurality of settings of the vehicle speed, engine rotational speed and the acceleration may be indicated or recorded in histogram.

Furthermore, not only the running conditions or the working conditions but also a combination of other switching data may be recorded. For instance, in combination with the fuel flow meter, the data on fuel efficiency and fuel consumption in relation to the running conditions may be recorded, thus contributing to an economical driving.

We claim:

1. An automotive driving instruction system comprising:

a plurality of sensors disposed at various parts of the automobile for detecting the driving conditions of the automobile;

a computer for reading the outputs of said sensors, calculating a plurality of values representing the driving conditions of the automobile, and controlling issuance of an alarm when any of the results of the calculations of said values becomes equal to the corresponding one of predetermined settings associated with the values;

a replaceable external memory unit for storing the accumulated values of said alarm, and the accumulated values of said alarm for respective causes by the processing operation of said computer, said external memory being adapted to indicate the stored data by the processing operation of a data processing unit.

2. A system according to claim 1, further comprising an indication device, said computer applying a signal representing the accumulated value of an alarm to said indication device when controlling issuance of said alarm, said indication device accordingly indicating the number of generations of alarms.

3. A system according to claim 1, wherein said computer contains an internal memory operative as a plurality of counters corresponding to said plurality of values representing the driving conditions, and means for incrementing the data of a corresponding counter and storing the same each time the calculation of said plurality of values reaches the predetermined settings and the generation of alarm is controlled.

4. A system according to claim 1, further comprising a plurality of switches corresponding to the working conditions of the driver respectively, a clock, and means for storing the states of said switches and the time of operation thereof in said external memory unit in accordance with the operation of said switches.

5. A system according to claim 2, further comprising means for storing the code of the driver at a predetermined address of said external memory unit, said computer reading out the data stored at said address at regular intervals of time for detecting any replacement of said external memory unit, said computer reading out the accumulated value of generations of the alarms and the accumulated value of the alarms and rewriting the same therein in response to the detection of the replacement of said external memory unit, means for accumulating the subsequent alarms on the basis of the values after the rewriting, for storing the accumulated value in said external memory unit, and means for applying said accumulated value to said indication device and indicating the same thereon at the time of an issuance of an alarm.

6. An automotive driving instruction system comprising:
- a plurality of sensors disposed at various parts of the automobile for detecting the driving conditions of the automobile including running speed of the automobile and rotational speed of the automobile engine;
- a computer for reading the outputs of said sensors, calculating a plurality of values representing respective duration of at least one of (a) excess running speed of the automobile, (b) excess acceleration of the automobile and (c) excess rotational speed of the automobile engine, and controlling issuance of an alarm when any one of the results of the calculations of said values reaches the corresponding one of predetermined settings associated with the values; and
- a replaceable external memory unit for storing the accumulated values of said alarm, and the accumulated values of said alarm for respective causes by the processing operation of said computer.

7. A system according to claim 6, further comprising an indication device, said computer applying a signal representing the accumulated value of an alarm to said indication device when controlling issuance of said alarm, said indication device accordingly indicating the number of generations of alarms.

8. A system according to claim 6, wherein said computer contains an internal memory operative as a plurality of counters corresponding to said plurality of values for measuring said respective durations, and means for incrementing the data of a corresponding counter and storing the same each time the calculation of said plurality of values reaches the predetermined settings and the generation of alarm is controlled.

9. A system according to claim 6, further comprising a plurality of switches corresponding to the working conditions of the driver respectively, a clock, and means for storing the states of said switches and the time of operation thereof in said external memory unit in accordance with the operation of said switches.

10. A system according to claim 9, further comprising means for storing the code of the driver at a predetermined address of said external memory unit, said computer reading out the data stored at said address at regular intervals of time for detecting any replacement of said external memory unit, said computer reading out the accumulated value of generations of the alarms and the accumulated value of the alarms and rewriting the same therein in response to the detection of the replacement of said external memory unit, means for accumulating the subsequent alarms on the basis of the values after the rewriting, for storing the accumulated value in said external memory unit, and means for applying said accumulated value to said indication device and indicating the same thereon at the time of an issuance of an alarm.

* * * * *